US006233692B1

(12) United States Patent
Villanueva

(10) Patent No.: US 6,233,692 B1
(45) Date of Patent: May 15, 2001

(54) POWER SHARE CONTROLLER FOR PROVIDING CONTINUOUS SYSTEM PERIPHERAL BAY ACCESS BETWEEN AT LEAST TWO DATA PROCESSING SYSTEMS ON A DATA NETWORK WITH NO INTERRUPTION TO PERIPHERAL BAY OPERATION

(75) Inventor: Peter T. Villanueva, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/203,612

(22) Filed: Dec. 2, 1998

(51) Int. Cl.[7] ........................................ G06F 13/00
(52) U.S. Cl. ................ 713/324; 713/340; 710/129; 710/102; 709/217; 709/219
(58) Field of Search .................. 710/101–103, 710/2, 129, 64; 361/368; 713/310, 320, 324, 323, 330, 340; 709/214–216, 217–219

(56) References Cited

U.S. PATENT DOCUMENTS

| 5,251,320 | * | 10/1993 | Kuzawinski et al. | 713/324 |
|---|---|---|---|---|
| 5,396,636 | * | 3/1995 | Gallagher et al. | 713/300 |
| 5,454,080 | * | 9/1995 | Fasig et al. | 710/103 |
| 5,483,419 | * | 1/1996 | Kaczeus, Sr. et al. | 361/685 |
| 5,652,892 | * | 7/1997 | Ugajin | 713/340 |
| 5,692,197 | * | 11/1997 | Narad et al. | 713/300 |
| 5,754,870 | * | 5/1998 | Pollard et al. | 713/323 |
| 5,781,448 | * | 7/1998 | Nakamura et al. | 364/492 |
| 5,790,374 | * | 8/1998 | Wong | 361/685 |
| 5,822,547 | * | 10/1998 | Boesch et al. | 710/103 |

* cited by examiner

Primary Examiner—Robert Beausoleil
Assistant Examiner—Raymond N Phan
(74) Attorney, Agent, or Firm—Antonelli, Terry, Stout & Kraus, LLP

(57) ABSTRACT

A data processing system such as a server system connected to a data network having a network peripheral bay access feature that enables another server system on the same data network to have access to the system peripheral bay with no operating interruption, when the system main baseboard is disabled. An exemplary server system includes a system peripheral bay supporting at least one peripheral device; a system main baseboard supporting at least one main processor; and a power share board supporting a power share controller for controlling power voltages supplied to the system peripheral bay and the system main baseboard, including automatically switching off electrical connection between the power share board and the system main baseboard when the system main baseboard is disabled, while maintaining the electrical connection between the power share board and the system peripheral bay for peripheral bay operation to enable another server on the same data network to have access to the system peripheral bay with no operating interruption.

28 Claims, 6 Drawing Sheets

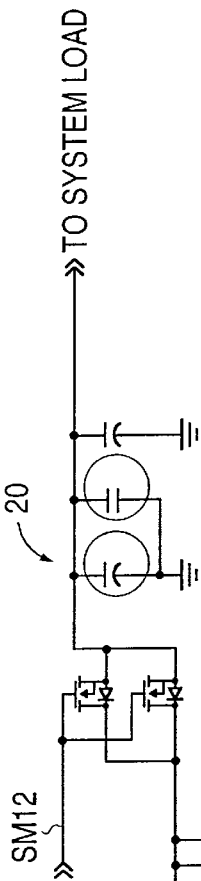
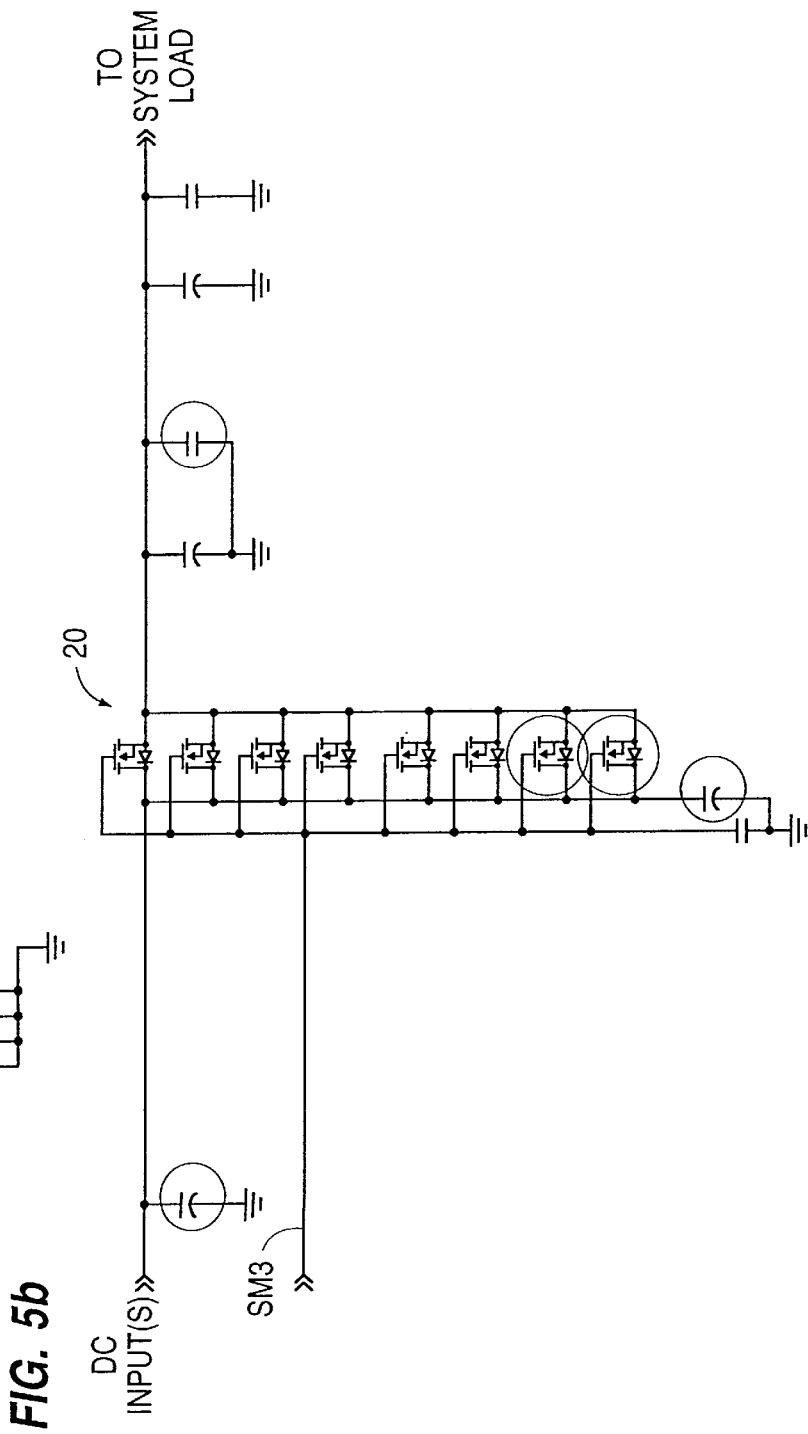
FIG. 5a
FIG. 5b

US 6,233,692 B1

POWER SHARE CONTROLLER FOR PROVIDING CONTINUOUS SYSTEM PERIPHERAL BAY ACCESS BETWEEN AT LEAST TWO DATA PROCESSING SYSTEMS ON A DATA NETWORK WITH NO INTERRUPTION TO PERIPHERAL BAY OPERATION

TECHNICAL FIELD

The present invention generally relates to data communications, and more particularly, relates to a cost effective power share controller and method for sharing peripheral bays between two data processing systems such as server systems on a data network, when either system main baseboard is turned off without any interruption to the peripheral bay operation.

RELATED ART

A data network is a system designed to link together data processing systems, peripheral devices and communication devices for data communications. Examples of such a network include a local area network (LAN), a wide area network (WAN), a campus area network (CAN), a metropolitan area network (MAN), a global area network (GAN), and a system area network (SAN). Data processing systems include personal computers (PCs), work stations, input/output devices, and server systems. For purposes of this disclosure, a data processing system refers to a server system connected to a data network. Each server system comprises a motherboard (baseboard) for supporting at least one main processor, a peripheral board (peripheral bay) for supporting one or more peripheral devices such as magnetic or optical information storage devices. In these types of data processing systems, the peripheral devices are diverse in nature including, but not limited to, small computer system interface (SCSI) devices.

Generally, if the baseboard power supply of a first server system on a data network is turned off for any reasons, electrical power provided to the peripheral bay supporting the peripheral devices is also interrupted. Consequently, a second server system on a data network cannot access data resources provided by the peripheral devices of the first server system. That is, if one server system is turned off, data resources on a peripheral bay cannot be accessed and shared by another server system on a data network. The failure to share data resources of the peripheral bays between two server systems on a data network, when either system main baseboard is disabled, is extremely inconvenient. One solution to sharing the peripheral bays of server systems on a data network is to install a stand-alone power unit that is independent from a server system for providing a constant source of electrical power to the peripheral bay of each server system. However, installation of a stand-alone power unit to a server system on a data network is labor intensive, costly, and is inefficient because of high power dissipation. Therefore, there is a need for a more simple, yet cost effective solution to sharing the peripheral bays between server systems on a data network when either system main baseboard is turned off without any interruption to the peripheral bay operation.

SUMMARY OF THE INVENTION

Accordingly, the present invention is directed to an exemplary data processing system such as a server system connected to a data network having a network peripheral bay access feature that enable another server system on the data network to have access to the system peripheral bay with no operating interruption, when the system main baseboard is disabled. The exemplary server system includes a system peripheral bay supporting at least one peripheral device; a system main baseboard supporting at least one main processor; and a power share controller for controlling power voltages supplied to the system peripheral bay and the system main baseboard, including automatically switching off electrical connection to the system main baseboard when the system main baseboard is disabled (turned off), while maintaining the electrical connection to the system peripheral bay so as to enable another server on the data network to have continuous access to the system peripheral bay with no operating interruption.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 5A–5D are detailed circuit diagrams of exemplary baseboard power switches of the power share controller for use in a server system according to the principles of the present invention.

DETAILED DESCRIPTION

Figure 1:
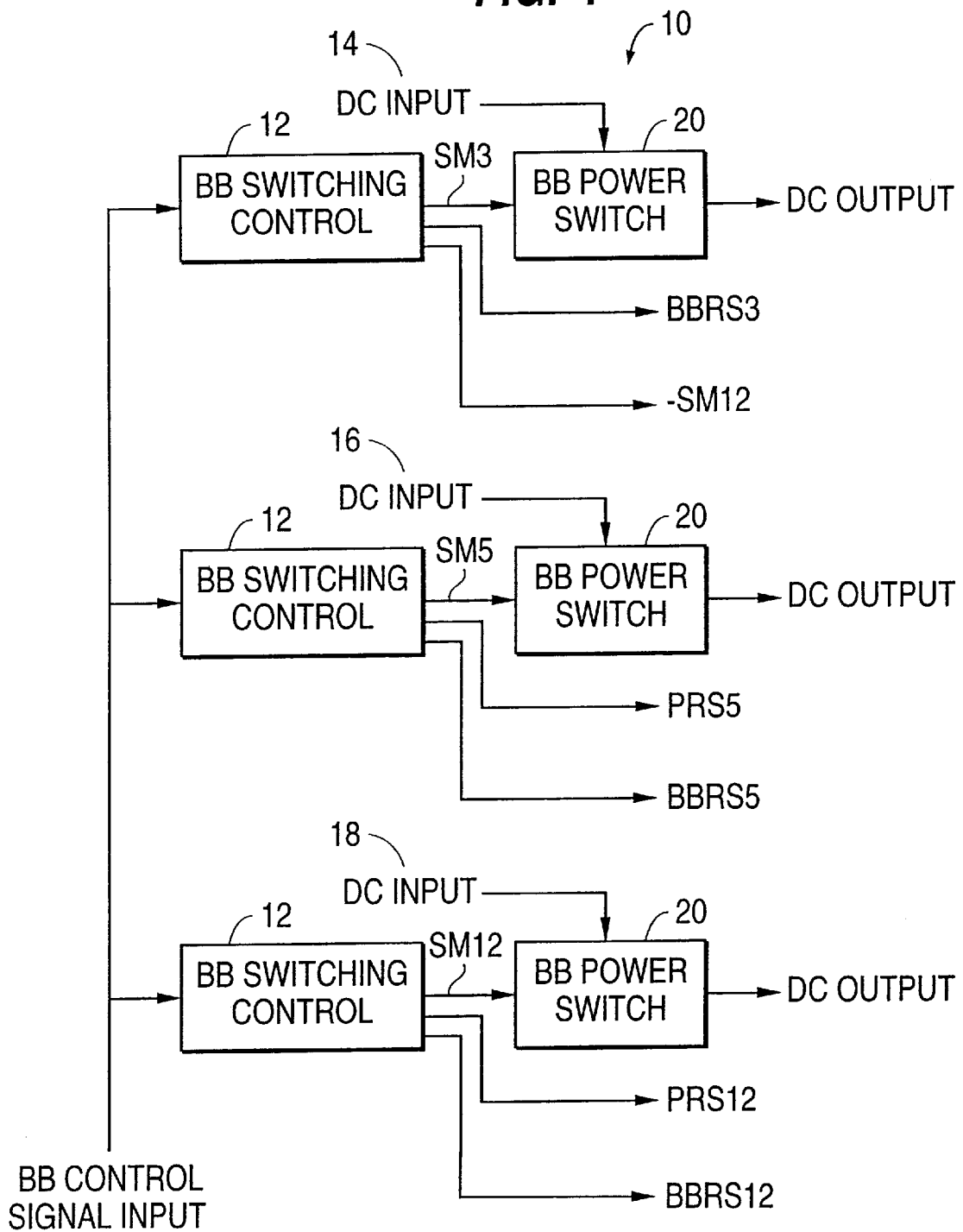
FIG. 1 is a block diagram of an exemplary power share controller for use in a data processing system such as a server system according to the principles of the present invention.

Reference is made now to FIG. 1, which illustrates a block diagram of an exemplary power share controller 10 for use in a data processing system such as a server system connected to a data network according to the principles of the present invention. As intended by the present invention, the power share controller 10 provides a cost effective, power efficient, and yet simple solution to providing peripheral bay access between two server systems when either system main baseboard is turned off, without any interruption to the peripheral bay operation. When installed in one server system on a data network, the power share controller 10 allows another server system on a data network to have continuous access to a peripheral bay of the server system for networking with no operating interruption, even when the main baseboard of the server system is disabled (turned off). When installed in each server system on a data network, the power share controller 10 allows server systems on a data network to have mutual and continuous access to peripheral bays of respective server systems with no operating interruption, even when the main baseboard of either server system is disabled (turned off). The power share controller 10 may be integrated into, or installed as a discrete circuit module on, a power share board of a server system.

As shown in FIG. 1, the power share controller 10 includes a baseboard switch 5 control circuit 12 and a baseboard power switch circuit 14. The baseboard switch control circuit 12 comprises a plurality of baseboard (BB) switch control units 12A, 12B, 12C, and 12D and peripheral bay (PB) switch control units 12E and 12F. The baseboard power switch circuit 14 comprises a plurality of baseboard power switches 14A, 14B, 14C, and 14D. The number of baseboard power switches contained in the power switch circuit 14 corresponds to the number of baseboard switch control units contained in the switch control circuit 12. Both the number of baseboard power switches and switch control units correspond to different direct current (DC) power sources required by a server system for operation. For example, if a server system requires four different DC voltages such as 3.3 volts, 5 volts, 12 volts, and −12 volts for operation, then four different baseboard power switches 14A, 14B, 14C, and 14D are used as shown in FIG. 1, to control transmission of four different DC voltages from a power share board to a system main baseboard. Namely, 3.3 volts, 5 volts, 12 volts, and −12 volts are provided in response to system main signals SM3, −SM12, SM5, and SM12 from the corresponding baseboard switch control units 12A, 12B, 12C, and 12D. It is noted, however, that different DC or AC voltages from different power sources or a single power source may be used for providing power supply to a server system or other types of data processing systems, including personal computers (PCS) and workstations, by way of example.

The primary role of the power share controller 10 as shown in FIG. 1 is to switch off the electrical connection between the power share board and the main system baseboard once the main system baseboard is disabled (turned off), while maintaining the system peripheral bay in operation so as to enable another server system on a data network to have access to the system peripheral bay with no operating interruption. Under normal system operation, that is, when the main baseboard of a server system is enabled (turned on), the baseboard (BB) control signal input to the switch control circuit 12 of the power share controller 10 is switched "on", e.g., exhibiting a "high" logic state. Each of the baseboard (BB) switch control units 12A, 12B, 12C, and 12D generates a respective system main signal SM3, −SM12, SM5, or SM12 for providing electrical connection between the power share board and the main system baseboard. The system main signal SM3 represents a first switch control signal for turning on or off a first baseboard (BB) power switch 14A to enable passage of a first DC output voltage, for example, 3.3 volts, to a system load of the main system baseboard. The system main signal −SM12 represents a second switch control signal for turning on or off a second baseboard (BB) power switch 14B to enable passage of a second DC output voltage, for example, −12 volts, to a system load of the main system baseboard. Similarly, the system main signal SM5 represents a third switch control signal for turning on or off a third baseboard (BB3 power switch 14C to enable passage of a third DC output voltage, for example, 5 volts, to a system load of the main system baseboard. Likewise, the system main signal SM12 represents a fourth switch control signal for turning on or off a fourth baseboard (BB) power switch 14D to enable passage of a fourth DC output voltage, for example, 12 volts, to a system load of the main system baseboard.

The electrical connection between the power share board and the main system baseboard is provided when the respective system main signals SM3, −SM12, SM5, and SM12 exhibit a "high" logic state for switching on the baseboard (BB) power switches 14A, 14B, 14C, and 14D to pass the respective DC output voltages such as 3.3 volts, −12 volts, 5 volts, and 12 volts to the system load of the main system baseboard of the server system. Baseboard remote sense signals such as BBRS3, BBRS5, and BBRS12 are provided from first, third, and fourth baseboard switch control units 12A, 12C, and 12D with a "high" logic state to activate a corresponding baseboard remote sense circuit (not shown) for DC outputs feedback to power subsystems, in order to maintain all DC output voltages of the main baseboard in regulation. Simultaneously, peripheral remote sense signals such as PRS5 and PRS12 are provided from first and second peripheral bay (PB) switch control units 12E and 12F with an opposite "low" logic state to deactivate a corresponding peripheral remote sense circuit (not shown). However, DC output voltages provided to the peripheral bay of the server system are maintained in regulation for normal operation. It is noted, in this example, that a peripheral remote sense signal for 3.3 volts is not required by a server system for DC output feedback.

Under abnormal system operation, that is, when the main baseboard of a server system is disabled (turned off), the baseboard (BB) control signal input to the switch control circuit 12 of the power share controller 10 is switched "off", e.g., exhibiting an opposite "low" logic state. As a result, all output signals from the baseboard switch control units 12A, 12B, 12C, 12D, 12E, and 12F are in the reverse polarity. In particular, the respective system main signals SM3, SM5, SM12, and −SM12 are going "low" to interrupt all DC output voltages such as 3.3 volts, 5 volts, 12 volts, and −12 volts provided to a system load of the main baseboard. Baseboard remote sense signals such as BBRS3, BBRS5, and BBRS12 are going "low" to deactivate a corresponding baseboard remote sense circuit (not shown). However, the peripheral remote sense signals such as PRS5 and PRS12 are going "high" to activate a corresponding peripheral remote sense circuit (not shown) for controlling DC output feedback from the peripheral bay to power subsystems, in order to maintain all DC output voltages provided to the peripheral bay of the server system in regulation without any operating interruption. In other words, when the baseboard (BB) control input is "low," DC output voltages provided to the main baseboard of the server system are interrupted. However, the DC output voltages provided to the peripheral bay of the server system are not interrupted and are maintained in regulation so as to enable an external server system to have access to the system peripheral bay without operating interruption.

It is therefore seen that the peripheral remote sense signals such as PRS5 and PRS12 and the baseboard remote sense signals such as BBRS3, BBRS5, and BBRS12 provided from the switch control circuit 12 of the power share controller 10 are complementary according to the present exemplary embodiment of the present invention. BBRS signals are active when the main baseboard of a server system is enabled (turned on). In contrast, PRS signals are active when the main baseboard of a server system is disabled (turned off). During operation, only one feedback circuit supplies a power supply remote sense feedback to the power subsystems in order to compensate for voltage drop regardless of whether the server system is in a normal system operation with DC output voltages provided to both the main baseboard and the peripheral bay, or in an abnormal system operation with DC output voltages provided only to the peripheral bay.

Figure 2:
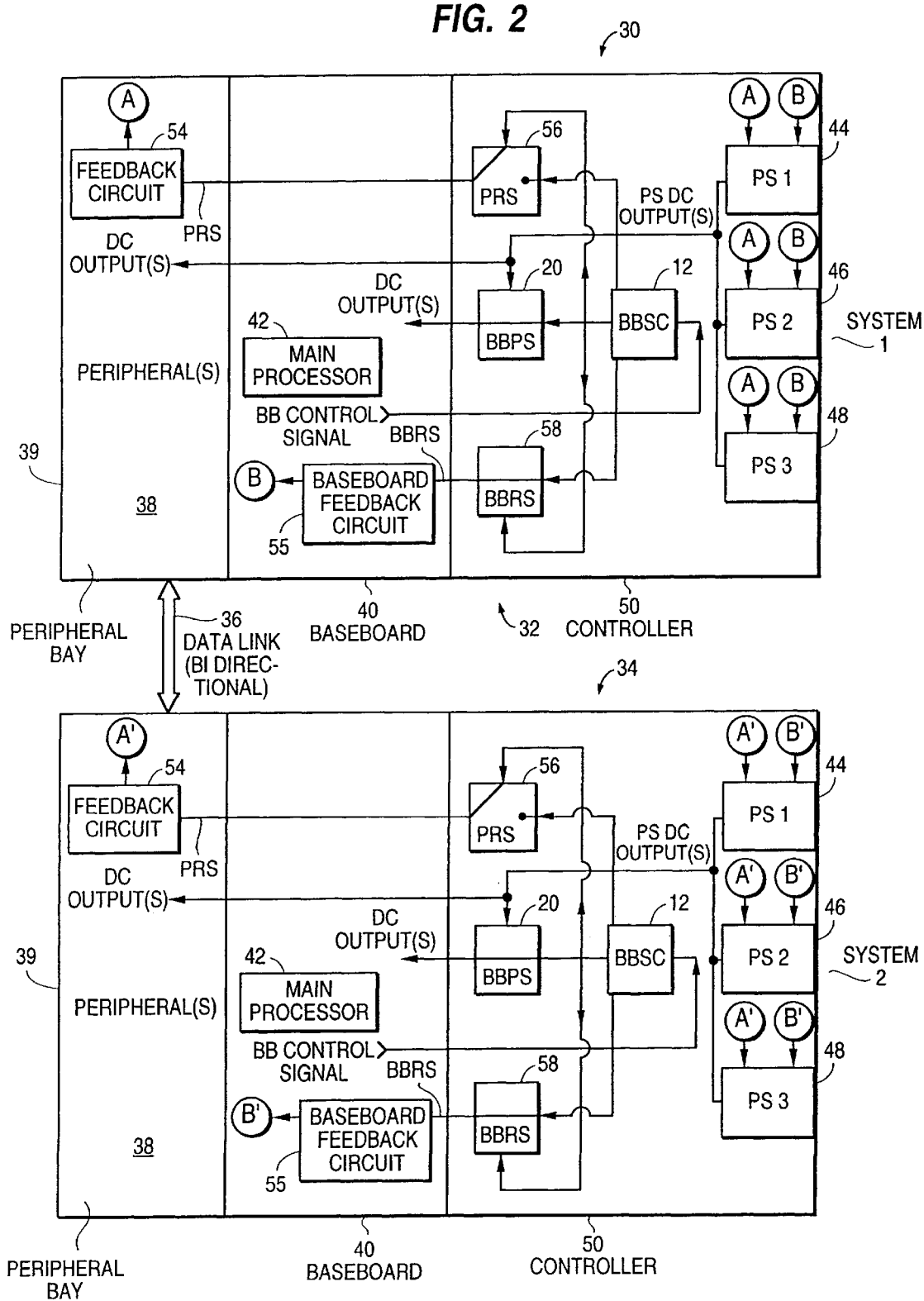
FIG. 2 is a system schematic of an exemplary data network comprising at least two server systems for mutually sharing data resources during normal system operation according to the principles of the present invention.

Discussion turns now to FIG. 2 which illustrates an exemplary data network 20 comprising at least two server systems 20A and 20B for mutually sharing data resources during normal system operation according to the principles of the present invention. For purposes of discussion, each server system 20A or 20B contains a power share controller 10 integrated on a power share board 50 for providing system peripheral bay access between two server systems 20A and 20B on a data network 20 when a main baseboard 40 of either server system 20A or 20B is turned off without any interruption to the peripheral bay operation. It is noted, however, that not all server systems within a data network need to contain a power share controller 10 as shown in FIG. 1 for operation, e.g., if continued (uninterrupted) access with respect to a particular server's peripheral bay devices is not important, that particular server need not contain the power share controller of the present invention. Further, a second, remote server system 20B of a data network 20 needs not contain a power share controller 10 to gain access to the periphery bay 30 of the first server system 20A with no operating interruption when the main baseboard 40 of the first server system 20A is disabled (turned off). However, if both server systems 20A and 20B contain respective power share controller 10 as shown in FIG. 2, the peripheral bays 30 between two server systems 20A and 20B can be equally shared and readily accessed from one another, even when the main baseboard 40 of either server system 20A or 20B is disabled (turned off) without any interruption to the peripheral bay operation.

As shown in FIG. 2, at least two server systems 20A and 20B are connected via a bidirectional wired or wireless data link 36, which may be any form of a network connection. Typically, the data link is provided to permit access to peripheral devices mounted or installed on the peripheral bay 30 of either server system 20A or 20B. It should be understood that the present invention is not limited to any particular number of server systems on a data network, nor any type of data link connecting the server systems together. Each server system 20A or 20B comprises a peripheral bay 30, a main baseboard 40, and a power share board 50. The peripheral bay 30 supports at least one peripheral device 32 and includes a peripheral feedback circuit 34 for providing a power supply remote sense feedback to power subsystems for enabling regulated DC output voltages to be supplied to the peripheral devices 32. The main baseboard 40 supports at least one main processor 42 and includes a baseboard feedback circuit 44 for providing a power supply remote sense feedback to the power subsystems for enabling regulated DC output voltages to be supplied to the main processor 42. The power share board 50 supports a power share controller 10 including a baseboard switch control circuit 12, a baseboard power switch circuit 14, power subsystems containing redundant power supply sources 52, 54, and 56 for providing DC output voltages, a baseboard remote sense (BBRS) circuit 58 for controlling a DC output feedback to the power supply sources 52, 54, and 56 (during normal operation), and a peripheral remote sense circuit 60 for controlling a DC output feedback to the power supply sources 52, 54, and 56 (during abnormal operation).

Power supply sources 52, 54, and 56 provide in parallel different DC output voltages such as 3.3 volts, 5 volts, 12 volts, and −12 volts required by a server system for operation, including the peripheral bay 30 containing at least one peripheral device 32 and the main baseboard 40 containing at least one main processor 40. Although the baseboard switch control circuit 12 and the baseboard power switch circuit 14 of the power share controller 10 as shown in FIG. 2 have been simplified to show a single output such as SM, BBRS and PRS signals, it should be understood that each of the different DC output voltages such as 3.3 volts, 5 volts, 12 volts and −12 volts are present with separate power supply lines in the manner described with reference to FIG. 1.

During normal system operation, that is, when the main baseboard 40 of a first server system 20A on a data network 20, for example, is enabled (turned on), the baseboard switch control circuit 12 generates system main signals SM and baseboard remote sense signals BBRS exhibiting "high" logic states and complementary periphery remote sense signals PRS exhibiting "low" logic state for DC output feedback to power supply sources 52, 54, and 56. The baseboard switch control circuit 12 includes baseboard switch control units 12A, 12B, 12C, and 12D and peripheral bay switch control units 12E and 12F as shown in FIG. 1. The baseboard power switch circuit 14 includes different baseboard power switches 14A, 14B, 14C, and 14D for permitting passage of all DC output voltages such as 3.3 volts, 5 volts, 12 volts and −12 volts to both the peripheral bay 30 and the main baseboard 40 of the server system 20A for operation. DC output voltages such as 3.3 volts, 5 volts, 12 volts, and −−12 volts from the redundant power supply sources 52, 54, and 56 are provided in parallel to the peripheral bay 30 supporting at least one peripheral device 32 and the main baseboard 40 supporting at least one main processor 42. The electrical connections from the power supply sources 52, 54, and 56 to the peripheral bay 30 and the main baseboard 40 are illustrated as only a single line for the sake of simplicity, but it should be understood that, in fact, they represent four separate DC output voltages provided along separate lines from the power supply sources 52, 54, and 56, and from the power share board 50 to the peripheral bay 30 and the main baseboard 40.

The baseboard remote sense signals BBRS provided from the baseboard switch control circuit 12 exhibit "high" logic states to activate (switch on) a corresponding baseboard remote sense circuit 58. The baseboard remote sense circuit 58 is then closed to pass power supply remote sense signals PSRS to the baseboard feedback circuit 44 for DC output feedback to redundant power supply sources 52, 54, and 56 (during normal operation), in order to maintain all DC output voltages of the main baseboard 40 in regulation. The power supply remote sense signals PSRS are input DC voltages of the baseboard remote sense circuit 58 and indicate a power supply remote sense feedback from a server system in order to compensate for any voltage drop from any of the DC output voltages used by the server system.

The peripheral remote sense signals PRS simultaneously provided from the baseboard switch control circuit 12 exhibit "low" logic states to deactivate (switch off) a corresponding peripheral remote sense circuit 60. The peripheral remote sense circuit 60 is then opened to disconnect passage of power supply remote sense signals PSRS to the peripheral feedback circuit 34 for DC outputs feedback to redundant power supply sources 52, 54, and 56. The power supply remote sense signals PSRS are also input DC voltages of the peripheral remote sense circuit 60 and indicate a power supply remote sense feedback from a server system in order to compensate for voltage drop from any of the DC output voltages used by the server system. However, the power supply remote sense signals PSRS input to the baseboard remote sense circuit 58 and the peripheral remote sense circuit 60 may or may not contain the same DC voltage levels because of different voltage drops in different DC output voltages provided from the power supply sources 52, 54, and 56. If a second server system 20B is in normal system operation as shown in FIG. 2, the DC output voltages such as 3.3 volts, 5 volts, 12 volts and −12 volts are also provided to both the peripheral bay 30 and the main baseboard 40 for operation. Accordingly, one server system can readily access the peripheral bay of another server system through a bidirectional data link using network communication protocol, i.e., the peripheral devices are being powered and are accessible.

Figure 3:
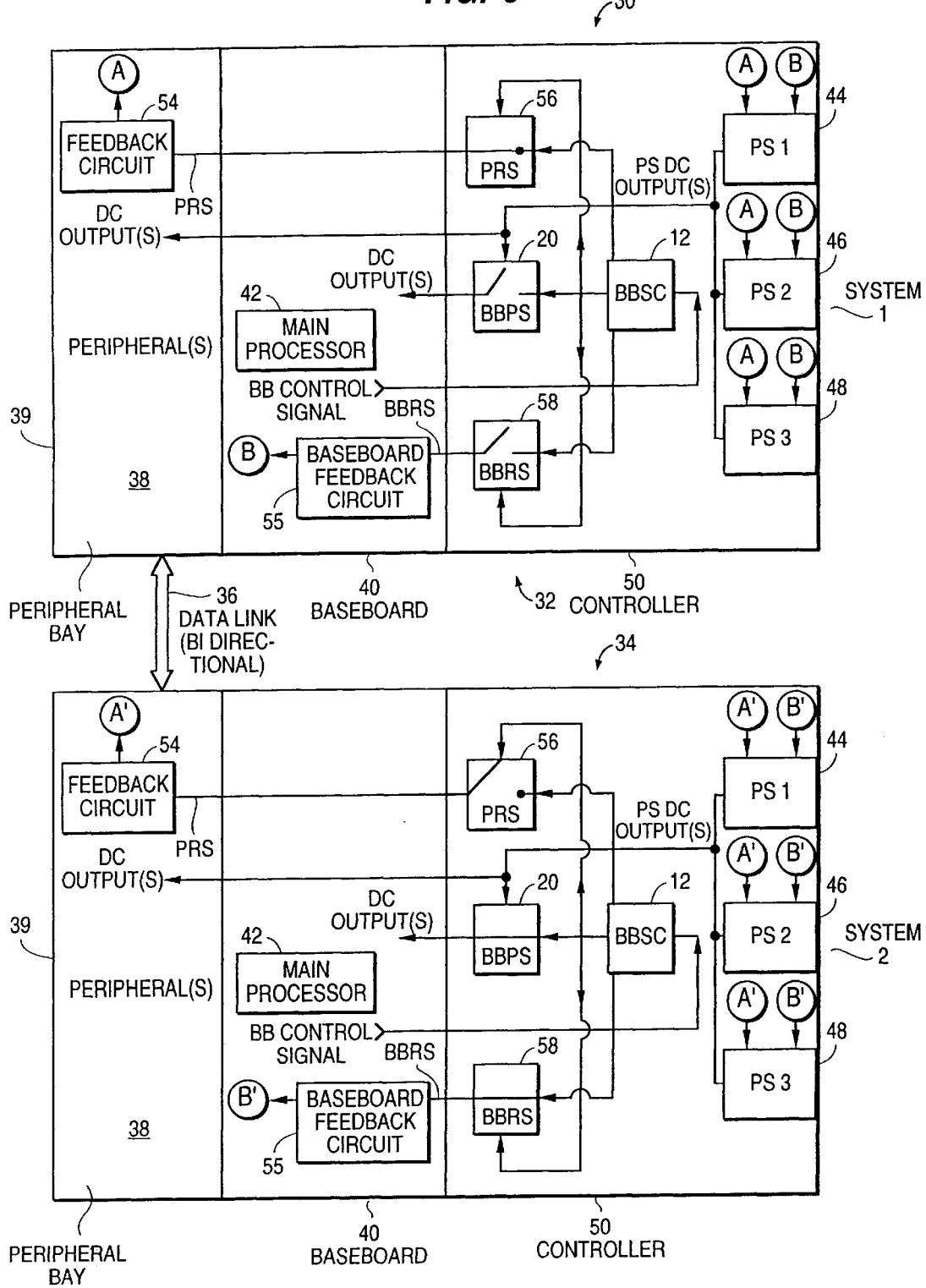
FIG. 3 is a system schematic of an exemplary data network comprising at least two server systems for sharing data resources during abnormal system operation according to the principles of the present invention.

FIG. 3 illustrates an exemplary data network 20 comprising at least two data server systems 20A and 20B for sharing data resources during abnormal system operation according to the principles of the present invention. As shown in FIG. 3, each server system 20A or 20B has a peripheral bay 30, a main baseboard 40, and a power share board 50. However, the first server system 20A is in an abnormal system operation, that is, the main baseboard 40 of the first server system 20A is disabled (turned off). With such exemplary embodiment, the second server system 20B is in a normal system operation and can have continuous access to the peripheral bay 30 of the first server system 20A with no operating interruption, even when the main baseboard 40 of the first server system 20A is disabled (turned off).

When the main baseboard 40 of the first server system 20A is disabled (turned off), the baseboard (BB) control signal input to the switch control circuit 12 of the power share controller 10 is automatically switched "off", e.g., exhibiting a "low" logic state. As a result, all output signals SM, BBRS and PRS from the baseboard switch control circuit 12 are reverse in polarity. The system main signals SM provided from the baseboard switch control circuit 12 are going "low" to open (switch off) the baseboard power switch circuit 14 and interrupt all DC output voltages such as 3.3 volts, 5 volts, 12 volts, and −12 volts provided to a system load of the main baseboard 40. Baseboard remote sense signals BBRS are going "low" to open (switch off) a corresponding baseboard remote sense circuit 58 and interrupt a power supply remote sense feedback from the main baseboard 40 to the power supply sources 52, 54, and 56. Simultaneously, the peripheral remote sense signals PRS are going "high" to close (switch on) a corresponding peripheral remote sense circuit 60 and activate a power supply remote sense feedback from the peripheral bay 30 to the power supply sources 52, 54, and 56 (during normal operation), in order to maintain all DC output voltages of the peripheral bay 30 of the server system 20A in regulation without any operation interruption to the peripheral bay 30. As a result, DC output voltages provided to the main baseboard 40 of the server system 20A are interrupted (disconnected). However, the DC output voltages provided to the peripheral bay 30 of the server system 20A are maintained in regulation so as to enable a second, remote server system 20B to have access to peripheral devices on the system peripheral bay with no operating interruption, even when the main baseboard 40 of the first server system 20A is disabled (turned off).

In sum, there are differing basic operators used when the main baseboard 40 of a server system 20A or 20B on a data network 20 is enabled (turned on) or disabled (turned off). If the peripheral remote sense circuit 60 is opened, then both the baseboard power switch 14 and the baseboard remote sense circuit 58 are closed (switch on) as shown in FIG. 2. In contrast, if the peripheral remote sense circuit 60 is closed, then both the baseboard power switch 14 and the baseboard remote sense circuit 58 are opened (switch off) as shown in FIG. 3. The power share controller 10 of the present invention functions to provide regulated DC power from the redundant power supply sources 52, 54, and 56 to the peripheral bay 30 supporting at least one peripheral device 32 so that an external server system on a data network or other types of data processing systems on a data network may communicate through a data link 36 and access to the peripheral device 32. This peripheral bay access feature is provided without any interruption to the peripheral bay operation and results in architectures which are low cost and permit uninterrupted sharing of information between two or more server systems in a data network.

Figure 4:
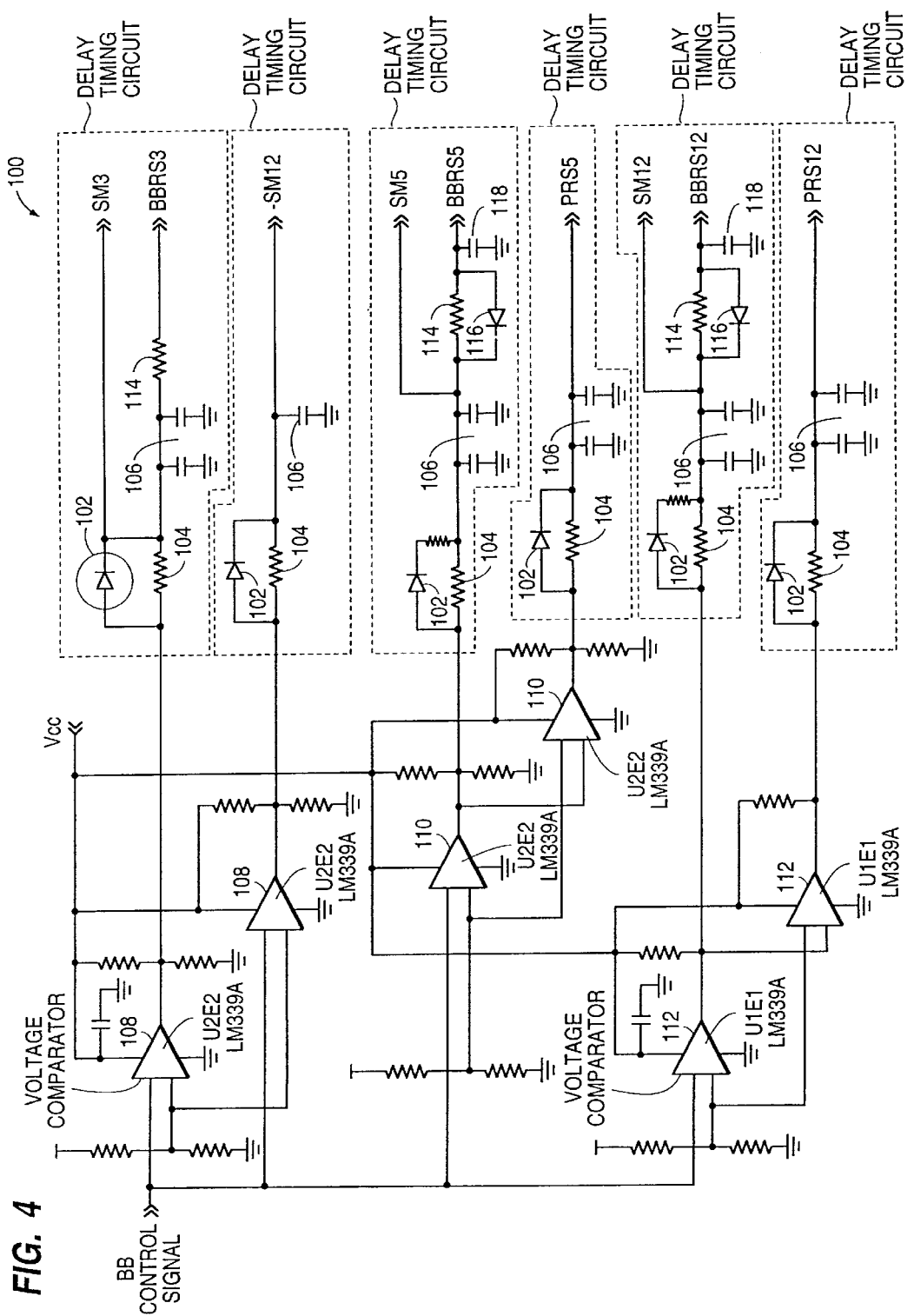
FIG. 4 is a detailed circuit diagram of an exemplary baseboard switch control circuit of the power share controller for use in a server system according to the principles of the present invention.

FIG. 4 illustrates a detailed circuit diagram of an exemplary baseboard switch control circuit 12 of the power share controller 10 for providing peripheral bay access between two server systems when either system main baseboard is turned off, without any interruption to the peripheral bay operation according to the principles of the present invention. The baseboard switch control circuit 12 may be integrated in the power share board 50, or may be installed as a discrete circuit component on the power share board 50. The baseboard switch control circuit 12 contains first, second, third and fourth baseboard switch control units 12A, 12B, 12C, and 12D and first and second peripheral bay switch control units 12E and 12F. Each of the baseboard switch control units 12A, 12B, 12C, and 12D and the peripheral bay switch units 12E and 12F includes a respective voltage comparator circuit having a comparator and a series of pull-up resistors, and a delay timing circuit for suppressing and controlling any voltage transient of overshoot and undershoot voltages from the power share board 50 to the main baseboard 40 and the peripheral bay 30 of a server system 20A or 20B when the main baseboard 40 is turned on and off.

For the first baseboard switch control unit 12A, the voltage comparator circuit includes a comparator (COMP) using, for example, model U2E2-LM339A having an inverting terminal connected between a serially connected resistors R1 and R2, a non-inverting terminal connected to receive an input baseboard control signal, and an output terminal connected between a serially connected pull-up resistors R3 and R4, and a capacitor C1 connected to a voltage terminal Vcc of the comparator (COMP) and the serially connected pull-up resistors R3 and R4. A delay timing circuit includes a diode D1 connected to an output terminal of the comparator (COMP) for producing a first system main signal SM3 exhibiting an "on" or "off" logic state complementary to the logic state of the input baseboard control signal, and serially connected resistors R5 and R6, in parallel with the diode D1, having a pair of parallel capacitors C2 and C3 disposed therebetween for producing a corresponding baseboard remote sensor signal BBRS3. The system main signal SM3 is going "high" to switch on a corresponding baseboard power switch 14A to a close position for providing a DC output voltage such as 3.3 volts to both the peripheral bay 30 and the main baseboard 40 of the server system 20A or 20B, when the main baseboard 40 of the server system 20A or 20B is enabled (turned on) during normal system operation. When the main baseboard 40 of the server system 20A or 20B is disabled (turned off), the system main signal SM3 is going "low" to switch off a corresponding baseboard power switch 14A to an open position for interrupting the DC output voltage provided to the main baseboard 40 of the server system 20A or 20B. Simultaneously, the baseboard remote sensor signal BBRS3 is going "low" to deactivate a corresponding baseboard remote sense circuit 58 for interrupting DC outputs feedback from the main baseboard 40 to the power supply sources 52, 54, and 56. As shown in FIGS. 2 and 3, the direct, non-switched power line connection between the power supply sources 52, 54, 56 and the peripheral bay 30, power is always supplied to the peripheral bay 30 (and thus peripheral devices 32), both during normal and abnormal operations.

For the second baseboard switch control unit 12B, the voltage comparator circuit includes a comparator (COMP) using, for example, model U2E2-LM339A and having an inverting terminal connected between serially connected resistors Ri and R2, a non-inverting terminal connected to receive an input baseboard control signal, and an output terminal connected between serially connected resistors R3 and R4. The delay timing circuit includes a diode D1 connected to an output terminal of the comparator (COMP), and a resistor RN connected in parallel with the diode D1 and in series with a capacitor C1 for producing a second system main signal –SM12 exhibiting an "on" or "off" logic state complementary to the logic state of the input baseboard control. The system main signal –SM12 is going "high" to switch on a corresponding baseboard power switch 14B to a close position for providing a DC output voltage such as –12 volts to both the peripheral bay 30 and the main baseboard 40 of the server system 20A or 20B, when the main baseboard 40 of the server system 20A or 20B is enabled (turned on) during normal system operation. When the main baseboard 40 of the server system 20A or 20B is disabled (turned off), the system main signal –SM12 is going "low" to switch off a corresponding baseboard power switch 14B to an open position for interrupting the DC output voltage provided to the main baseboard 40 of the server system 20A or 20B.

For the third baseboard switch control unit 12C, the voltage comparator circuit includes a comparator (COMP) using the same model U2E2-LM339A having an inverting terminal connected between a serially connected resistors R1 and R2, a non-inverting terminal connected to receive an input baseboard control signal, and an output terminal connected between a serially connected pull-up resistors R3 and R4. A delay timing circuit includes serially connected resistors R5 and R6, a first diode D1 and resistor R7 connected in parallel to resistor R5, a pair of parallel capacitors C1 and C2 disposed between resistors R5 and R6, a second diode D2 connected to input and output terminals of resistor R6, and capacitor C3 connected in parallel to resistor R6, for producing a third system main signal I SM5 exhibiting an "on" or "off" logic state complementary to the logic state of the input baseboard control signal and a corresponding baseboard remote sensor signal BBRS5. The system main signal SM5 is going "high" to switch on a corresponding baseboard power switch 14C to a close position for providing a DC output voltage such as 5 volts to both the peripheral bay 30 and the main baseboard 40 of the server system 20A or 20B, when the main baseboard 40 of the server system 20A or 20B is enabled (turned on) during normal system operation. When the main baseboard 40 of the server system 20A or 20B is disabled (turned off), the system main signal SM5 is going "low" to switch off a corresponding baseboard power switch 14C to an open position for interrupting the DC output voltage provided to the main baseboard 40 of the server system 20A or 20B. Simultaneously, the baseboard remote sensor signal BBRS5 is going "low" when the main baseboard 40 of the server system 20A or 20B is disabled (turned off) to deactivate a corresponding baseboard remote sense circuit 58 for interrupting DC output feedback from the main baseboard 40 to the power supply sources 52, 54, and 56.

For the fourth baseboard switch control unit 12D, the voltage comparator circuit includes a comparator (COMP) using, for example, model U1E1-LM339A having an inverting terminal connected between a serially connected resistors R1 and R2, a non-inverting terminal connected to receive an input baseboard control signal, and an output terminal connected to a pull-up resistor R3, and a capacitor C1 connected to a voltage terminal Vcc of the comparator (COMP). A delay timing circuit includes serially connected resistors R4 and R5, a first diode D1 and resistor R6 connected in parallel to resistor R4, a pair of parallel capacitors C2 and C3 disposed between resistors R4 and R5, a second diode D2 connected to input and output terminals of resistor R5, and capacitor C4 connected in parallel to resistor R6, for producing a fourth system main signal SM12 exhibiting an "on" or "off" logic state complementary to the logic state of the input baseboard control signal and a corresponding baseboard remote sensor signal BBRS12. The system main signal SM12 is going "high" to switch on a corresponding baseboard power switch 14D to a close position for providing a DC output voltage such as 12 volts to both the peripheral bay 30 and the main baseboard 40 of the server system 20A or 20B, when the main baseboard 40 of the server system 20A or 20B is enabled (turned on) during normal system operation. When the main baseboard 40 of the server system 20A or 20B is disabled (turned off), the system main signal SMl2 is going "low" to switch off a corresponding baseboard power switch 14D to an open position for interrupting the DC output voltage provided to the main baseboard 40 of the server system 20A or 20B. Simultaneously, the baseboard remote sensor signal BBRS12 is going "low" when the main baseboard 40 of the server system 20A or 20B is disabled (turned off) to deactivate a corresponding baseboard remote sense circuit 58 for interrupting DC outputs feedback from the main baseboard 40 to the power supply sources 52, 54, and 56.

For the first peripheral bay switch control unit 12E, the voltage comparator circuit includes a comparator (COMP) using model U2E2-LM339A and having an inverting terminal connected to an output terminal of the voltage comparator circuit of the third baseboard switch control unit 12D, a non-inverting terminal connected between a serially connected resistors R1 and R2, and an output terminal connected to a serially connected pull-up resistors R3 and R4. A delay timing circuit includes a diode D1 connected to an output terminal of the comparator (COMP), and a resistor RS connected in parallel with the diode D1 and in series with parallel capacitors C1 and C2 for producing a first peripheral remote sense signal PRS5 exhibiting an "on" or "off" logic state complementary to the logic state of the baseboard remote sense signals BBRS3, BBRS5 and BBRS12.

For the second peripheral bay switch control unit 12F, the voltage comparator circuit includes a comparator (COMP) using model U1E1-LM339A having an inverting terminal connected to an output terminal of the voltage comparator circuit of the third baseboard switch control unit 12D, a non-inverting terminal connected between serially connected resistor R1 and R2, and an output terminal connected to a pull-up resistor R3. A delay timing circuit includes a diode D1 connected to an output terminal of the comparator (COMP), and a resistor R4 connected in parallel with the diode D1 and in series with parallel capacitors C1 and C2 for producing a second peripheral remote sense signal PRS 12 exhibiting an "on" or "off" logic state complementary to the logic state of the baseboard remote sense signals BBRS3, BBRS5 and BBRS12.

The choice of the particular resistance and capacitance values of each switch control unit 12A, 12B, 12C, 12D, 12E, and 12F of the baseboard switch control circuit 12 determines the degree of voltage comparison and transient filtering provided. The individual system main signals SM3, SM5, SM12, and −SM12 reverse polarity and interrupt the supply of all DC output voltages provided from the redundant power supply sources 52, 54, and 56 to the main baseboard 40 as soon as the input baseboard control signal indicates that the main baseboard 40 is disabled (turned off). DC output voltages are, however, provided from the redundant power supply sources 52, 54, and 56 to the peripheral bay 30 in a direct, non-switched manner to maintain the peripheral bay 30 in regulation without any operating interruption.

Figure 5C:
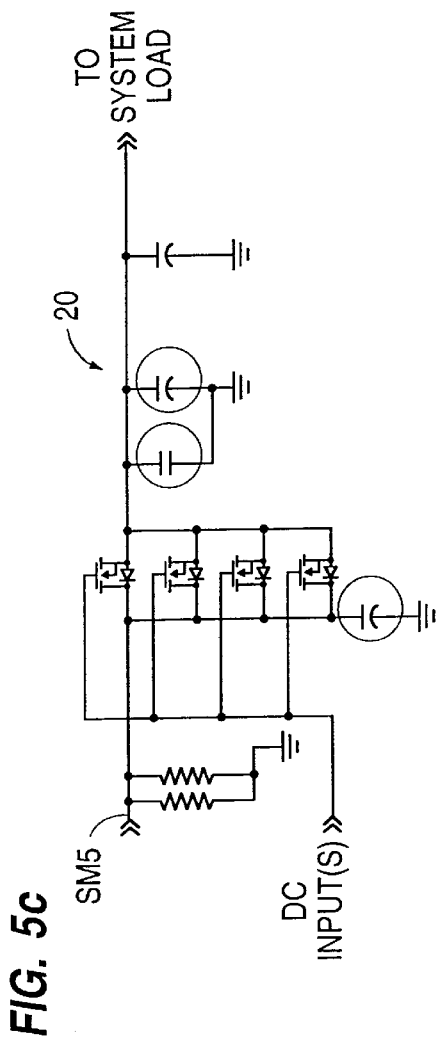

FIGS. 5A–D are detailed circuit diagrams of exemplary baseboard power switches 14A, 14B, 14C, and 14D of the power share controller 14 for switching transmission of different DC output voltages such as 3.3 volts, 5 volts, 12 volts, and −12 volts in a server system according to the principles of the present invention. FIG. 5A illustrates a first baseboard power switch 14A which operates to pass a DC input voltage of, for example, 3.3 volts to a system load of a main baseboard 40 of a server system in response to a logic state of the first system main signal SM3 provided from the first baseboard switch control unit 12A as shown in FIG. 4. The first baseboard power switch 14A has capacitors C1–C7 connected in parallel with an input terminal of a DC input voltage, and a series of power MOSFET ("Metal-Oxide-Semiconductor Field-Effect Transistor") arranged in parallel to the capacitors C1–C7 and operated in response to the first system main signal SM3 to pass the DC input voltage to a system load of a main baseboard 40 of a server system. For example, when the main baseboard 40 of a server system 20A or 20B, as shown in FIGS. 2 and 3, is disabled (turned off), the first system main signal SM3 is going "low" to open the baseboard power switch circuit 14A and interrupt a DC output voltage provided to a system load of the main baseboard 40 of a server system 20A or 20B.

FIG. SB illustrates a second baseboard power switch 14B which operates to pass a DC input voltage of −12 volts to the system load of a main baseboard 40 of a server system in response to a logic state of the second system main signal −SM12 provided from the second baseboard switch control unit 12B as shown in FIG. 4. The second baseboard power switch 14B has a series of parallel resistors R1–R3 coupled to receive a DC input voltage of −12 volts, a MOSFET having a gate connected to receive the second system main signal −SM12 via a Zener diode and source and drain disposed between the parallel resistors R1–R3, and a parallel connected resistor R5 and capacitor C1 for operation in response to the second system main signal −SM12. When the main baseboard 40 of a server system 20A or 20B as shown in FIGS. 2 and 3 is disabled (turned off), the third system main signal −SM12 is going "low" to open the baseboard power switch circuit 14B and interrupt a DC output voltage provided to a system load of the main baseboard 40 of a server system 20A or 20B.

FIG. 5C illustrates a third baseboard power switch 14C which operates to pass a DC input voltage of, for example, 5 volts to the system load of a main baseboard 40 of a server system in response to a logic state of the third system main signal SM5 provided from the third baseboard switch control unit 12C as shown in FIG. 4. The third baseboard power switch 14C has a series of MOSFETs each having a gate connected to receive the third system main signal SM5, and source and drain disposed between the parallel resistors R1–R2, and a parallel connected capacitors C1–C4 for operation in response to the third system main signal SM5. Again, when the main baseboard 40 of a server system 20A or 20B as shown in FIGS. 2 and 3 is disabled (turned off), the third system main signal SM5 is going "low" to open the baseboard power switch circuit 14B and interrupt a DC output voltage provided to a system load of the main based 40 of a server system 20A or 20B.

Figure 5D:
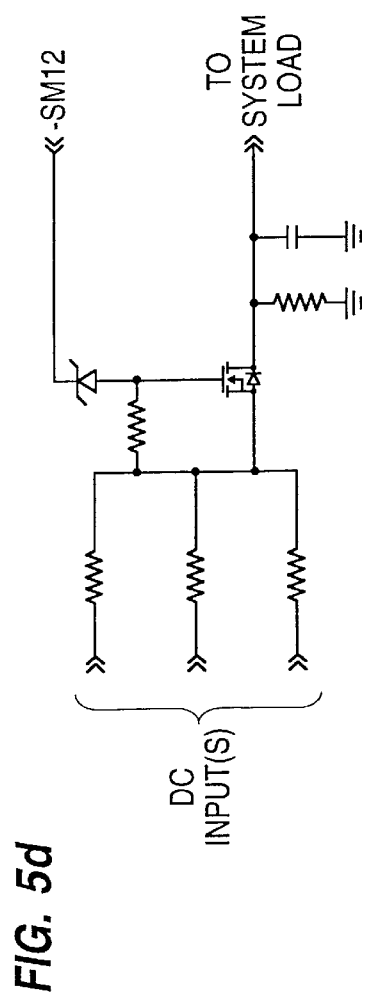

FIG. 5D illustrates a fourth baseboard power switch 14D which operates to pass a DC input voltage of 12 volts to the system load of a main baseboard 40 of a server system in response to a logic state of the fourth system main signal SM12 provided from the fourth Ibaseboard switch control unit 12D as shown in FIG. 4. The fourth baseboard power switch 14D has a series of parallel resistors R1–R4 coupled to receive a DC input voltage of 12 volts, coupled MOSFETs each having a gate connected to receive the third system main signal SM12 and source and drain disposed between the parallel resistors R1–R4, and a series of capacitors C1, C2, and C3 connected in parallel to pass a DC input voltage of 12 volts to the system load of a main baseboard 40 of a server system 20A or 20B. When the main baseboard 40 of a server system 20A or 20B, as shown in FIGS. 2 and 3, is disabled (turned off), the third system main signal SM12 is going "low" to open the baseboard power switch circuit 14D and interrupt a DC output voltage provided to a system load of the main baseboard 40 of a server system. Again, the choice of the particular resistance and capacitance values of each baseboard power switch 14A, 14B, 14C, and 14D of the baseboard power switch circuit 14 determines the accuracy of the DC output voltage transmission and transient filtering provided.

As described, the present invention provides a cost effective, power efficient and yet simple power share controller integrated on a power share board for providing mutual peripheral bay access between two server systems when either system main baseboard is turned off without any interruption to the peripheral bay operation.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular exemplary embodiments disclosed, but that the present invention includes all embodiments falling within the scope of the appended claims.

What is claimed is:

1. A data processing system connected to a data network, comprising:

a peripheral bay which supports at least one peripheral device;

a main baseboard which supports at least one processor; and a power share board which supports at least a power supply source for supplying power voltages to the peripheral bay and the main baseboard, and a power share controller for controlling the power voltages supplied to the peripheral bay and the main baseboard, including automatically switching off electrical connection to the main baseboard when the main baseboard is disabled, while maintaining electrical connection to the peripheral bay to enable another data processing system on said data network to have access to the peripheral bay without operating interruption.

2. A data processing system as claimed in claim 1, wherein said power share controller provides said power voltages from the power supply source to the processor and the peripheral device during normal system operations, and automatically interrupts said power voltages provided to the processor when the processor is turned off, while maintaining said power voltages provided to the peripheral device for peripheral bay operation with no interruption.

3. A data processing system as claimed in claim 2, wherein said power share controller comprises:
   a baseboard switch control circuit which generates switch control signals exhibiting a logic state complementary to a logic state of an input baseboard control signal; and
   a baseboard power switch circuit which enables transmission of said power voltages from the power supply source to the processor and the peripheral device in response to the logic state of said switch control signals.

4. A data processing system as claimed in claim 3, wherein said power share board further comprises:
   a baseboard remote sense circuit which controls a power supply remote sense feedback from the main baseboard to the power supply source when the processor is turned on; and
   a peripheral bay remote sense circuit which controls a power supply remote sense feedback from the peripheral bay to the power supply source when the processor is turned off.

5. A data processing system as claimed in claim 4, wherein said baseboard switch control circuit, during normal system operations, generates baseboard remote sense signals exhibiting a first logic state to activate the baseboard remote sense circuit for said power supply remote sense feedback from the baseboard to the power supply source, in order to maintain all power voltages of the main baseboard in regulation, and simultaneously, generates peripheral remote sense signals exhibiting a second logic state opposite to said first logic state to deactivate the peripheral remote sense circuit.

6. A data processing system as claimed in claim 4, wherein said baseboard switch control circuit, during abnormal system operations, generates baseboard remote sense signals exhibiting a first logic state to deactivate the baseboard remote sense circuit, and simultaneously, generates peripheral remote sense signals exhibiting a second logic state opposite to said first logic state to deactivate the peripheral remote sense circuit for said power supply remote sense feedback from the peripheral bay to the power supply source, in order to maintain all power voltages of the peripheral bay in regulation so as to enable an external server system to have access to the peripheral bay with no operating interruption.

7. A data network, comprising:
   a plurality of data processing systems interconnected by a data link, each data processing system including a processor and at least one peripheral device; and p1 at least one power share controller which provides electrical power to a corresponding data processing system, including at least one peripheral device of said corresponding data processing system, and when the processor of said corresponding data processing system is turned off, said at least one power share controller enables another data processing system on said data network to have access to the peripheral device of said corresponding data processing system with no operating interruption while the processor of said corresponding data processing system is turned off.

8. A data network as claimed in claim 7, wherein each power share controller comprises:
   a power supply source which provides said electrical power; and
   a power control circuit which provides said electrical power from the power supply source to the processor and to peripheral device of said corresponding data processing system when the processor is turned on, and which provides said electrical power from the power supply source only to the peripheral device when the processor of said corresponding data processing system is turned off.

9. A data network as claimed in claim 7, wherein said plurality of data processing systems comprise server systems.

10. A data network as claimed in claim 8, wherein said power control circuit generates a power supply control signal controlling application of said electrical power to the processor in response to a signal indicating an operational status of the processor.

11. A data network as claimed in claim 8, wherein said power control circuit includes a power switch which, when closed, provides said electrical power from the power supply source to the processor and, when opened, disconnects said electrical power from the power supply source to the processor in response to the signal indicating an operational status of the processor.

12. A data network as claimed in claim 7, wherein said power share controller comprises:
   a baseboard switch control circuit which generates switch control signals exhibiting a logic state complementary to a logic state of an input baseboard control signal; and
   a baseboard power switch circuit which provides said electrical power from a power supply source to the processor and the peripheral device in response to the logic state of said switch control signals.

13. A data network as claimed in claim 12, wherein said power share controller is integrated on a power share board, and wherein said power share board comprises:
   a baseboard remote sense circuit which controls a power supply remote sense feedback from the main baseboard to the power supply source when the processor is turned on; and
   a peripheral bay remote sense circuit which controls a power supply remote sense feedback from the peripheral bay to the power supply source when the processor is turned off.

14. A data network as claimed in claim 12, wherein said baseboard switch control circuit, during normal system operations, generates baseboard remote sense signals exhibiting a first logic state to activate the baseboard remote sense circuit for said power supply remote sense feedback from the baseboard to the power supply source, in order to maintain all power voltages of the main baseboard in regulation, and simultaneously, generates peripheral remote sense signals exhibiting a second logic state opposite to said first logic state to deactivate the peripheral remote sense circuit.

15. A data network as claimed in claim 13, wherein said baseboard switch control circuit, during abnormal system operations, generates baseboard remote sense signals exhibiting a first logic state to deactivate the baseboard remote sense circuit, and simultaneously, generates peripheral remote sense signals exhibiting a second logic state opposite to said first logic state to deactivate the peripheral remote sense circuit for said power supply remote sense feedback from the peripheral bay to the power supply source, in order to maintain all power voltages of the peripheral bay in regulation so as to enable an external server system to have access to the peripheral bay with no operating interruption.

16. A method for ensuring peripheral bay access of a data processing system including a main baseboard supporting a processor and a peripheral bay supporting at least one peripheral device on a data network, comprising the steps of:

determining whether a main baseboard of the data processing system is enabled or disabled;

when the main baseboard of the data processing system is enabled, maintaining electrical power to both the main baseboard and the peripheral bay in regulation; and when the main baseboard of the data processing system is disabled, interrupting said electrical power provided to the main baseboard while maintaining said electrical power to the peripheral bay in regulation to enable an external system on said data network to have access to the peripheral bay of the data processing system with no operating interruption.

17. A method as claimed in claim 16, wherein said data processing system corresponds to a server system on a data network, and comprises:

a peripheral bay which supports at least one peripheral device;

a main baseboard which supports at least one processor; and a power share controller which controls application of said electrical power to the peripheral bay and the main baseboard, including automatically switching off electrical connection to the main baseboard when the main baseboard is disabled, while maintaining the electrical connection to the peripheral bay to enable another data processing system on said data network to have access to the peripheral bay with no operating interruption.

18. A method as claimed in claim 17, wherein said data processing system further comprises:

a power share board supporting said power share controller and containing at least one power supply source for providing said electrical power to the peripheral bay and the main baseboard, said power share controller providing said electrical power from the power supply source to the processor and the peripheral device during normal system operations, and automatically interrupting said electrical power provided to the processor when the processor is turned off, while maintaining said power voltages provided to the peripheral device for peripheral bay operation with no interruption.

19. A method as claimed in claim 18, wherein said power share controller comprises:

a baseboard switch control circuit which generates switch control signals exhibiting a logic state complementary to a logic state of an input baseboard control signal; and a baseboard power switch circuit which enables transmission of said power voltages from the power supply source to the processor and the peripheral device in response to the logic state of said switch control signals.

20. A method as claimed in claim 19, wherein said power share board further comprises:

a baseboard remote sense circuit which controls a power supply remote sense feedback from the main baseboard to the power supply source when the processor is turned on; and a peripheral bay remote sense circuit which controls a power supply remote sense feedback from the peripheral bay to the power supply source when the processor is turned off.

21. A method as claimed in claim 20, wherein said baseboard switch control circuit, during normal system operations, generates baseboard remote sense signals exhibiting a first logic state to activate the baseboard remote sense circuit for said power supply remote sense feedback from the baseboard to the power supply source, in order to maintain all power voltages of the main baseboard in regulation, and simultaneously, generates peripheral remote sense signals exhibiting a second logic state opposite to said first logic state to deactivate the peripheral remote sense circuit.

22. A method as claimed in claim 20, wherein said baseboard switch control circuit, during abnormal system operations, generates baseboard remote sense signals exhibiting a first logic state to deactivate the baseboard remote sense circuit, and simultaneously, generates peripheral remote sense signals exhibiting a second logic state opposite to said first logic state to deactivate the peripheral remote sense circuit for said power supply remote sense feedback from the peripheral bay to the power supply source, in order to maintain all power voltages of the peripheral bay in regulation so as to enable an external server system to have access to the peripheral bay with no operating interruption.

23. A data processing system, comprising:

one or more peripheral devices;

a processor; and one or more power supply sources which supply power voltages to one or more peripheral devices and to the processor; and a power share controller which controls the power voltages supplied to one or more peripheral devices and to the processor so as to allow another data processing system to have access to one or more peripheral devices even when the power voltages supplied to the processor have been disabled, said power share controller comprising:

a baseboard switch control circuit which generates switch control signals exhibiting a logic state complementary to a logic state of an input baseboard control signal; and a baseboard power switch circuit which enables transmission of said power voltages from one or more power supply sources to one or more peripheral devices and to the processor in response to the logic state of said switch control signals.

24. A data processing system as claimed in claim 23, wherein said power share controller provides power voltages to one or more peripheral devices and to the processor during normal system operations, and automatically interrupts said power voltages provided to the processor when the processor is turned off, while maintaining said power voltages provided to one or more peripheral devices for peripheral device operations without interruption.

25. A data processing system as claimed in claim 23, wherein said one or more peripheral devices include, but are not limited to, magnetic or optical information storage devices and small computer system interface (SCSI) devices.

26. A data processing system as claimed in claim 25, wherein said power share board further comprises:

a baseboard remote sense circuit which controls a power supply remote sense feedback from the processor to one or more power supply sources when the processor is turned on; and a peripheral bay remote sense circuit which controls a power supply remote sense feedback from one or more peripheral devices to one or more power supply sources when the processor is turned off.

27. A data processing system as claimed in claim 25, wherein said baseboard switch control circuit, during normal system operations, generates baseboard remote sense signals exhibiting a first logic state to activate the baseboard remote sense circuit for said power supply remote sense feedback from the processor back to one or more power supply sources so as to maintain all power voltages of the processor in regulation, and simultaneously, generates peripheral remote sense signals exhibiting a second logic state opposite to said first logic state to deactivate the peripheral remote sense circuit.

28. A data processing system as claimed in claim 25, wherein said baseboard switch control circuit, during abnormal system operations, generates baseboard remote sense signals exhibiting a first logic state to deactivate the baseboard remote sense circuit, and simultaneously, generates peripheral remote sense signals exhibiting a second logic state opposite to said first logic state to deactivate the peripheral remote sense circuit for said power supply remote sense feedback from one or more peripheral devices back to one or more power supply sources so as to maintain all power voltages of one or more peripheral devices in regulation so as to enable an external system to have access to one or more peripheral devices without operating interruption.

* * * * *